(12) United States Patent
Ogawara (10) Patent No.: US 11,833,687 B2
(45) Date of Patent: Dec. 5, 2023

(54) ROBOT APPARATUS, CONTROL METHOD FOR THE ROBOT APPARATUS, ASSEMBLY METHOD USING THE ROBOT APPARATUS, AND RECORDING MEDIUM

(71) Applicant: CANON KABUSHIKI KAISHA, Tokyo (JP)

(72) Inventor: Takayuki Ogawara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 16/036,542

(22) Filed: Jul. 16, 2018

(65) Prior Publication Data

US 2019/0022859 A1   Jan. 24, 2019

(30) Foreign Application Priority Data

Jul. 19, 2017   (JP) .................................. 2017-140153

(51) Int. Cl.
*B25J 13/08*   (2006.01)
*B25J 9/16*   (2006.01)

(52) U.S. Cl.
CPC .......... *B25J 9/1635* (2013.01); *B25J 9/1633* (2013.01); *B25J 9/1692* (2013.01); *B25J 9/1694* (2013.01); *B25J 13/085* (2013.01); *G05B 2219/39246* (2013.01); *G05B 2219/39529* (2013.01)

(58) Field of Classification Search
CPC ...... B25J 9/1635; B25J 9/1633; B25J 13/085; B25J 9/1692; B25J 9/1694; B25J 9/16; B25J 9/1679; B25J 9/1687; B25J 13/08; B25J 19/00; G05B 2219/39246; G05B 2219/39529
See application file for complete search history.

(56) References Cited

U.S. PATENT DOCUMENTS

| 2016/0256184 | A1* | 9/2016 | Shelton, IV | ......... A61B 17/072 |
| 2017/0266816 | A1* | 9/2017 | Takeuchi | ............... B25J 9/1633 |
| 2018/0071915 | A1* | 3/2018 | Khatib | .................... B25J 9/1656 |
| 2019/0000577 | A1* | 1/2019 | Shelton, IV | ........... A61B 34/37 |
| 2020/0030970 | A1* | 1/2020 | Mariyama | .............. G06N 20/10 |

FOREIGN PATENT DOCUMENTS

| CN | 101041220 A | 9/2007 |
| CN | 102218652 A | 10/2011 |
| CN | 102791441 A | 11/2012 |

(Continued)

*Primary Examiner* — Basil T. Jos
(74) *Attorney, Agent, or Firm* — Canon U.S.A., Inc. IP Division (57) ABSTRACT

A robot apparatus includes a robot arm having an end effector. The robot apparatus includes a position detection unit configured to detect a position of the end effector, and a control unit configured to control the robot apparatus, wherein the control unit includes a force control unit configured to control the end effector by force control, and information about a plurality of operation ranges in which the end effector operates by the force control, the plurality of operation ranges being set for the plurality of contact works, wherein the control unit controls the end effector using the position detection unit and the force control unit such that one of the plurality of contact works is performed within one of the plurality of operation ranges corresponding to the one of the plurality of contact works.

24 Claims, 6 Drawing Sheets

(56) References Cited

FOREIGN PATENT DOCUMENTS

| | | |
|---|---|---|
| JP | H08174460 A | 7/1996 |
| JP | H11123683 A | 5/1999 |
| JP | 2012-125852 A | 7/2012 |
| JP | 2014128857 A | 7/2014 |
| JP | 2015-226967 A | 12/2015 |
| JP | 2016068169 A | 5/2016 |

* cited by examiner

ROBOT APPARATUS, CONTROL METHOD FOR THE ROBOT APPARATUS, ASSEMBLY METHOD USING THE ROBOT APPARATUS, AND RECORDING MEDIUM

BACKGROUND OF THE INVENTION

Field of the Invention

The present invention relates to a robot apparatus that holds a target object using an end effector and does works, a control method for the robot apparatus, an assembly method using the robot apparatus, and a recording medium.

Description of the Related Art

In recent years, in order to deal with diversifying customers' needs, a certain type of robot is necessary in production automatization in production sites. Such a robot that can hold various types of target objects (assembly parts) and can assemble these target objects into another target objects (assembly parts to be assembled) in a plurality of steps. In Japanese Patent Publication Laid-Open No. 2012-125852, at a time of assembly, a control value of a force to act on a target object held by a robot arm is varied in accordance with a plurality of works. Accordingly, the robot deals with various assembly works for various types of parts.

However, in a method discussed in Japanese Patent Publication Laid-Open No. 2012-125852, an end of each work is determined by a reaction force generated when an assembly part as a target object and an assembly part to be assembled contact with each other. For this reason, an attitude of the robot arm changes due to external perturbations, and the assembly part contacts with objects other than the assembly part to be assembled to generate a reaction force. In this case, the reaction force is inappropriately recognized as a contact with the assembly part to be assembled, and thus an end of the work is inappropriately determined. The assembly, then, proceeds to a next work regardless of unsuccessful assembly or the held assembly part is released, and thus faulty assembly increases.

SUMMARY OF THE INVENTION

Embodiments of the present invention are directed to enhancing production efficiency of an assembly work for parts in assembly using force control. The enhancement of the production efficiency is implemented by detecting a reaction force generated by contact with a part other than an assembly part to be assembled, caused by unexpected external perturbations and reducing defective assembly.

According to embodiments of the present invention, a robot apparatus including a robot arm having a plurality of joints and an end effector, the end effector performing a predetermined work on a target object, the robot apparatus includes a position detection unit configured to detect a position of the end effector, and a control unit configured to control the robot apparatus. The control unit includes a force control unit configured to control an operation of the end effector by force control, and a storage unit configured to store an operation range in which the end effector operates by the force control. The control unit moves the end effector to a starting position of the predetermined work, and the control unit controls the operation of the end effector by the force control and the position detection unit detects the position of the end effector so that the predetermined work is performed within the operation range while the predetermined work starts and completes.

Further features of the present invention will become apparent from the following description of exemplary embodiments with reference to the attached drawings.

DESCRIPTION OF THE EMBODIMENTS

An exemplary embodiment of the present invention will be described below with reference to the accompanying drawings. The exemplary embodiment described below is only an example, and those skilled in the art can suitably modify the detailed configuration without departing from the scope of the present invention. Further, numerical values in the present exemplary embodiment are reference numerical values and thus the present invention is not limited to those values.

Figure 1:
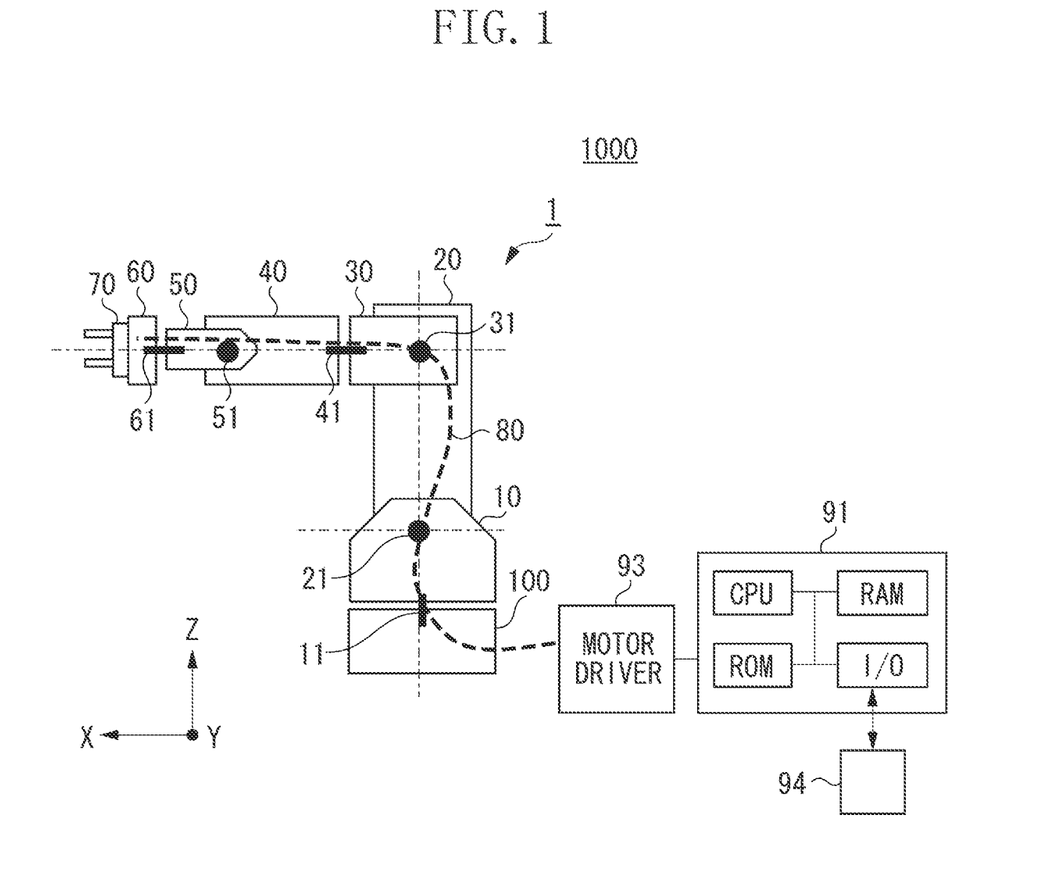
FIG. 1 is a whole configurational diagram illustrating a robot system according to an exemplary embodiment of the present invention.

FIG. 1 illustrates a whole configuration of a robot system according to the present exemplary embodiment. FIG. 1 illustrates a robot system 1000 viewed from a side according to the present exemplary embodiment. A lower left portion of FIG. 1 shows three-dimensional (XYZ) coordinate axes to be used for controlling the robot system 1000. As illustrated in the drawing, the Z axis in these coordinate axes extends toward an upper side in the drawing, and the X axis extends toward a left side in the drawing. The Y axis extends inward in the drawing.

As illustrated in FIG. 1, the robot system 1000 includes a robot arm body 1, an end effector 70 that is attached to a leading edge of the robot arm body 1, a control device 91 that controls the robot arm body 1, a motor driver 93, and an external input device 94. The external input device 94 is a teaching device such as a teaching pendant. The control device 91 includes a central processing unit (CPU) having a microprocessor. The control device 91 is connected to the external input (command) device 94. A control value from the control device 91 is transmitted to the motor driver 93 so that the robot arm body 1 is controlled.

Further, the control device 91 includes a read-only memory (ROM which is an operation range storage unit 96, described below) that stores a program for controlling a corresponding driving unit in accordance with various operations of the robot arm body 1 and data necessary for the control. Furthermore, the control device 91 includes a random access memory (RAM) that loads data, setting values, and programs necessary for controlling the robot system 1000 and is used as a working area of the CPU. External devices including the external input device 94 are connected by a general-purpose input/output interface I/O or the like.

An operation unit (not illustrated) is disposed on the external input device 94. The operation unit includes an operation key for moving an attitude (a position or an angle) of joints of the robot arm body 1 or a reference position of the end effector 70. In a case where any robot operation is performed by the operation unit of the external input device 94, the control device 91 controls an operation of the robot arm body 1 via a cable 80 (wire rod) in accordance with such operation of the external input device 94.

The robot arm body 1 illustrated in FIG. 1 is configured so that a plurality of links is connected in a serial-link format via a plurality of joints (six axes). Links 10, 20, 30, 40, 50, and 60 of the robot arm body 1 are driven via rotary joints 11, 21, 31, 41, 51, and 61. Each of the rotary joints 11, 21, 31, 41, 51, and 61 has a motor (in FIG. 2), described below, as a driving source.

Further, an encoder 95 (in FIG. 2) is provided to each of the joints 11, 21, 31, 41, 51, and 61 so that each rotary angle can be detected.

In the drawing, a base 100 and the link 10 of the robot arm body 1 are connected by the rotary joint 11 that rotates around a rotary shaft of a Z-axis direction. The rotary joint 11 has a movable range of about, for example, ±180° with respect to an initial attitude.

The link 10 and the link 20 of the robot arm body 1 are connected by the rotary joint 21. A rotary shaft of the rotary joint 21 matches with a Y-axis direction in a state of the drawing. The rotary joint 21 has a movable range of, for example, about ±80° with respect to the initial attitude.

The link 20 and the link 30 of the robot arm body 1 are connected by the rotary joint 31. A rotary shaft of the rotary joint 31 matches with a Y-axis direction in the illustrated state. The rotary joint 31 has a movable range of, for example, about ±70° with respect to the initial attitude.

The link 30 and the link 40 of the robot arm body 1 are connected by the rotary joint 41. A rotary shaft of the rotary joints 41 matches with an X-axis direction in the illustrated state. The rotary joint 41 has a movable range of, for example, about ±180° with respect to the initial attitude.

The link 40 and the link 50 of the robot arm body 1 are connected by the rotary joint 51. A rotary shaft of the rotary joint 51 matches with the Y-axis direction. The rotary joint 51 has a movable range of, for example, about ±120° with respect to the initial attitude.

The link 50 and the link 60 of the robot arm body 1 are connected by the rotary joint 61. A rotary shaft of the rotary joint 61 matches with the X-axis direction. The rotary joint 61 has a movable range of about ±240° with respect to the initial attitude.

As described above, in the present exemplary embodiment, the rotary shafts of the rotary joints 11, 41, and 61 are disposed parallel or coaxially with respect to central axes of two links connected by the joints (a dash line in FIG. 1). At this time, a relative angle about the rotary shafts of the two links can be changed.

On the other hand, the rotary shafts of the rotary joints 21, 31, and 51 are disposed so that each relative angle at which central shafts of the two links that combine these rotary joints can be changed.

The end effector 70 that is connected to the leading edge of the robot arm body 1 is connected to an electromotive hand or a pneumatically driven air hand for an assembly work and a moving work in a production line.

The end effector 70 is detachably mounted to the link 60 by semi-fixing means such as fastening by screws (not illustrated), or attaching means such as latching (not illustrated). Particularly in a case where the end effector 70 is detachably mounted, the robot arm body 1 is controlled so that the end effector 70 disposed in a predetermined position is attached and detached or replaced by an operation of the robot arm body 1. The end effector 70 holds a target object.

In the present exemplary embodiment, torque sensors 97 (in FIG. 2) and the encoders 95 are disposed on the joints, respectively, so that driving of the rotary joints 11 to 61 can be feedback-controlled.

Figure 2:
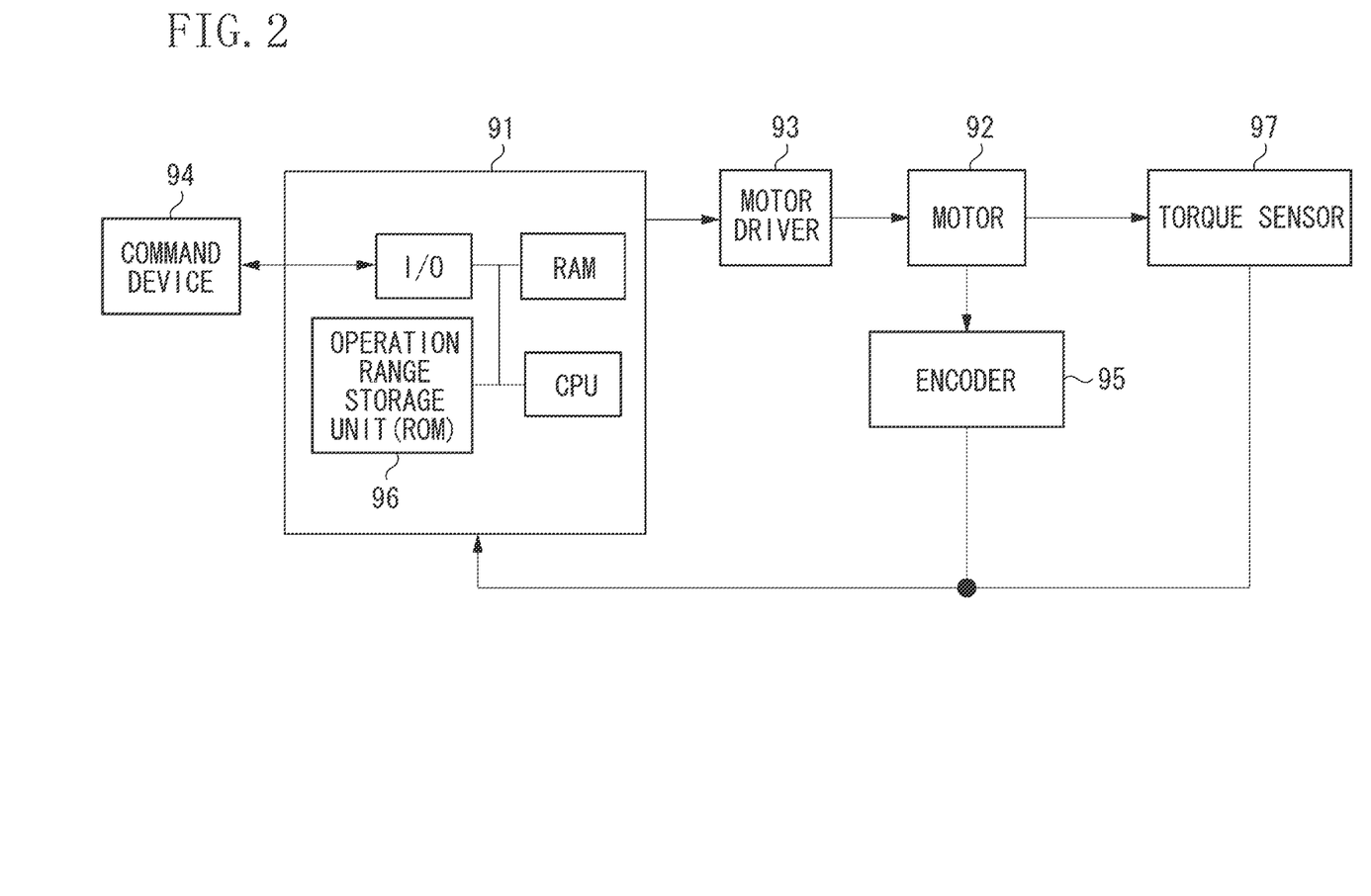
FIG. 2 is a control block diagram illustrating the robot system according to the exemplary embodiment of the present invention.

FIG. 2 is a control block diagram illustrating the robot system 1000 according to the exemplary embodiment of the present invention. Execution of a control program, described below, by the control device 91 controls respective units of the robot arm body 1. The encoder 95 can detect a position of the end effector 70. Position control can be made based on a value of the position of the end effector 70 so that the robot arm body 1 is controlled.

The end effector 70 can be controlled according to a block diagram similar to the block diagram illustrated in FIG. 2. The control will be described below with reference to FIG. 1 and FIG. 2.

The torque sensor 97 is provided to measure a driving torque of the motor 92 that drives each of the joints 11 to 61 of the robot arm body 1, namely, a rotary driving force to be applied from the motor 92 to each of the links 10 to 60. The torque sensor 97 is disposed at a predetermined position on a driving shaft of a driving system including the motor 92 or further a reduction gear (not illustrated) disposed inside the joints 11 to 61, respectively.

The robot arm body 1 according to the present exemplary embodiment is a six-axis articulated robot. A driving transmission system including a motor, a torque sensor, and an encoder is disposed on each of the joints. The driving transmission system is controlled suitably in accordance with a work to be done by the robot arm body 1 and a moving trajectory of the robot arm body 1. For convenience of the description, the motor 92, the torque sensor 97, and the encoder 95 are notably described. However, in an actual operation, the driving transmission systems of the respective joints are suitably controlled in order to realize a desired operation of the robot arm body 1.

In the drawing, as described above, the torque sensor 97 that measures a driving force of the respective joints 11 to 61 is disposed on a predetermined position on the driving axis of the driving system including the motor 92 that drives the rotary joints 11 to 61 or further the reduction gear, respectively. In a case where the motor 92 drives the joints 11 to 61, respectively, so that each of the angles thereof is changed, the torque sensor 97 detects a value of a torque applied at a time of driving the joints, respectively.

An output from the torque sensor 97 is returned to the control device 91 and is fed back to driving of the joints 11 to 61, so that the torque in the respective joints 11 to 61 can be controlled. Further, a force to be generated in the end effector 70 can be calculated based on the respective values of the torque sensor 97, and thus a load to be applied to a part to be assembled can be feedback-controlled. As a result, the force to be generated in the end effector 70 can be detected, and force control that can control the robot arm body 1 based on a value of the force to be generated in the end effector 70 can be made.

Although details of a configuration and respective layout positions of the torque sensor 97 are not illustrated, the torque sensor 97 that measures a rotary driving force of each of the rotary joints 11 to 61 can employ a publicly-known configuration.

The operation range storage unit 96 stores an operable range of the robot arm body 1 during force control as information about a driving angle of the motor 92. Further, the operation range storage unit 96 also stores thresholds of reaction forces to be switching timing of a plurality of predetermined works, described below, or a threshold of a moving amount of a held assembly part.

The CPU in the control device 91 compares a detection value of the torque sensor 97 and the encoder 95 with an operation range stored in the operation range storage unit 96, described below. The CPU then determines whether the robot arm body 1 is within the operation range in a flowchart of assembly steps, described below. Each of the torque sensors 97 functions as a force detection unit that detects force information, while each of the encoders 95 functions as a position detection unit that detects position information. Further, the CPU in the control device 91 calculates a control value for position control and force control to select the position control or the force control.

Figures 3A, 3B:
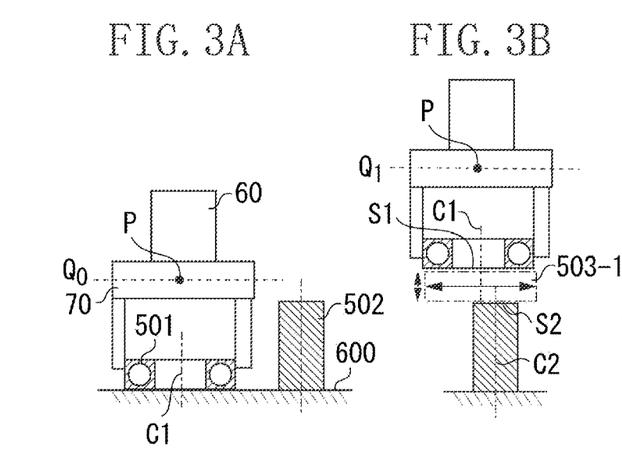
FIGS. 3A, 3B, 3C, 3D, 3E, 3F, 3G, 3H, 3I, and 3J are assembly process diagrams illustrating assembly steps according to the exemplary embodiment of the present invention.
Figure 3C:
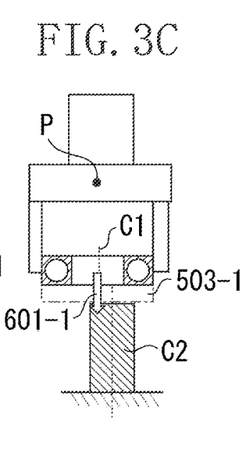
Figure 3D:
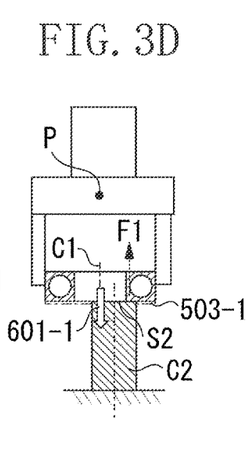
Figure 3E:
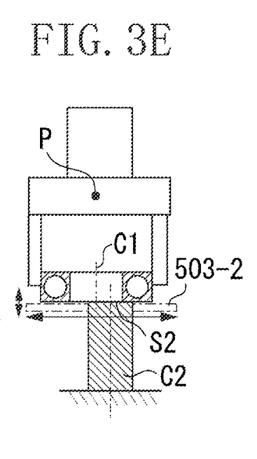
Figure 3F:
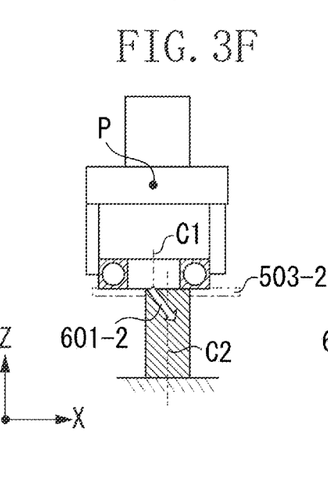
Figure 3G:
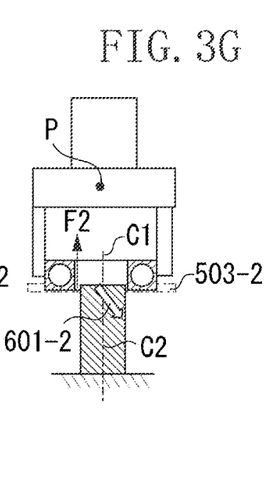
Figure 3H:
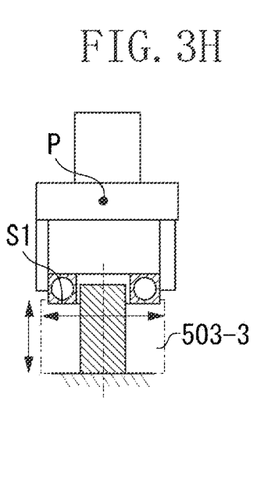

FIGS. 3A, 3B, 3C, 3D, 3E, 3F, 3G, 3H, 3I, and 3J are diagrams illustrating assembly steps for parts in the present exemplary embodiment. FIG. 4 is a flowchart illustrating the assembly steps for parts according to the present exemplary embodiment. The assembly steps will be described in detail below with reference to FIGS. 3A, 3B, 3C, 3D, 3E, 3F, 3G, 3H, 3I, and 3J, and FIG. 4. A lower left portion of FIG. 3F shows coordinate axes of a three-dimensional (XYZ) coordinate system to be used for control.

FIG. 3A illustrates initial layouts of an assembly part 501 and an assembly part to be assembled 502. The assembly part 501 and the assembly part to be assembled 502 are disposed on a base 600. The assembly part to be assembled 502 is fixed to the base 600. A reference point P is set on the end effector 70 that holds the assembly part 501. The assembly part 501 and the assembly part to be assembled 502 are assembled so that an article is produced.

In this state, in step S301 of FIG. 4, according to an assembly starting instruction, the robot arm body 1 moves the reference point P of the end effector 70 to a holding position Q0 of the assembly part 501 by position control.

When movement to the holding position Q0 completes, in step S302, the assembly part 501 is held in a holding position where a center axis C1 of the assembly part 501 matches with the reference point P of the end effector 70 on an XY coordinate. As illustrated in FIG. 3B, the reference point P is moved to an assembly starting position Q1 just before the assembly part to be assembled 502 contacts with the assembly part 501.

In step S303, when the assembly part 501 is moved to the assembly starting position Q1 in FIG. 3B, the control device 91 determines whether the reference point P of the end effector 70 is moved from the encoder 95 of the robot arm body 1 to the assembly starting position Q1. In a case where the control device 91 determines that the reference point P of the end effector 70 is not moved from the encoder 95 of the robot arm body 1 to the assembly starting position Q1 (No in step S303), the processing returns to step S302 and the movement to the assembly starting position Q1 continues. In a case where the control device 91 determines that the reference point P of the end effector 70 is moved from the encoder 95 of the robot arm body 1 to the assembly starting position Q1 (Yes in step S303), the processing proceeds to step S304. Step S303 is a starting position moving step.

In step S304, an operation range within which the end effector 70 can move by force control is read from the ROM. The operation range represents an allowable range within which the robot arm body 1 which is under the force control can move in accordance with the assembly part 501, the assembly part to be assembled 502, and respective works such as a seeking work and a contact work during the assembly work. The operation range is appropriately set so that the control can be stable and an assembly time can be shortened.

In the present exemplary embodiment, the operation range to be set in step S304 is determined based on respective design dimensions of the assembly part 501, the assembly part to be assembled 502, and the robot system 1000. For example, in an operation range 503-1 illustrated in FIG. 3B, a Z direction is set in an area between an upper surface S2 of the assembly part to be assembled 502 and a bottom surface S1 of the assembly part 501 with respect to the reference point P as a reference. Further, an XY direction is determined based on the center axis C1 of the assembly part 501 in a design.

The assembly part 501 is held so that the reference point P of the end effector 70 matches with the center axis C1 of the assembly part 501. Therefore, the operation range 503-1 on the XY coordinate can be set based on the reference point P.

The operation range 503-1 is set based on the design dimensions of the assembly part 501 and the robot system 1000, but can be set based on a result obtained by an experiment of an actual assembly of the robot system 1000.

Further, a determination is made based on a change in a detection value from a unit for detecting force information that the assembly part 501 contacts with the assembly part to be assembled 502. Based on a position of the robot arm body 1 at that time, the operation range 503-1 can be set.

In the operation range 503-1 of the end effector 70, the force control is achieved by setting each driving amount of the respective motors 92 of the rotary joints 11 to 61 in the robot arm body 1 to be within a driving limitation range corresponding to the operation range 503-1.

Further, the driving amount that achieves the operation range 503-1 is set based on the reference point P of the end effector 70, and the operation range 503-1 is offset to be controlled around the reference point P. As a result, the determination can be made whether the end effector 70 is within the set operation range 503-1.

The driving amount of the motor 92 corresponding to such operation range is stored in the operation range storage unit 96. The CPU in the control device 91 then reads the driving amount if necessary. The driving of the motor of the robot arm body 1 is controlled based on the operation range.

The processing then proceeds to step S305, and a control mode of the robot arm body 1 is switched from the position control to the force control. The contact work for causing the assembly part 501 to contact with the assembly part to be assembled 502 starts. An arrow 601-1 indicating a direction of an instruction value of a predetermined force is input by making the force control on the robot arm body 1. While the assembly part 501 is being moved to a direction where the assembly part 501 contacts with the assembly part to be assembled 502, a force is applied to the assembly part 501. This force is assumed to be applied similarly to the end effector 70. The torque sensors 97 detects the force, and the force is fed back to the control device 91.

After a start of the force control in step S305, in step S306, the control device 91 determines, based on a detection value from the encoder 95 in the robot arm body 1, whether the reference point P of the end effector 70 is within the operation range 503-1 set in step S304. In a case where the control device 91 determines that the reference point P of the end effector 70 is within the operation range 503-1 (Yes in step S306), the processing proceeds to step S308. Otherwise (No in step S306), the processing proceeds to step S307.

Step S307 is a correction step for a case where the reference point P is moved out of the set operation range 503-1 due to an external perturbation or the like that occurs during the contact work by the force control. That is, in a case where the end effector 70 is moved out of the operation range 503-1, the assembly itself is disabled due to a misalignment amount or the end effector 70 contacts with another peripheral device. As a result, defective assembly is likely to occur. For this reason, it is necessary to guide the end effector 70 to a position where the assembly is likely to be carried out securely.

The reference point P might be moved to greatly depart from the operation range 503-1 due to unexpected external perturbations. In this case, the control mode is switched from the force control under which the feedback control is made based on a force command value to the position control under which the feedback control is made based on a target position command value. In the position control, the reference point P which deviates from the range is controlled so as to return to the center in the operation range 503-1. Thereafter, the control mode is again switched from the position control to the force control, and the contact work is continued. That is, step S307 is also a control switching step.

Further, in the above description, the reference point P is returned to the center in the operation range 503-1 by using the position control. However, a threshold is set for a detection value from the encoder 95, and in a case where the reference point P does not depart from the operation range 503-1 by an amount smaller than the threshold, the reference point P can be returned under the force control. In this case, a predetermined force command value is supplied as an input of the feedback control, and the end effector 70 is moved to the operation range 503-1. Enlargement of a rigidity parameter in the force command value at this time can cause a force command value for returning the end effector 70 to the operation range 503-1. That is, the end effector 70 can be moved to the operation range 503-1.

A correction method can be selected by setting a range of correction by the force control and a range of correction by the position control outside the operation range 503-1. As a result, a number of switching times for control can be reduced, and stable control can be made.

The above-described configuration prevents an issue that the assembly is disabled. Such issue is caused because an external force is applied to a direction where such a force is not originally applied due to external perturbations and a moving position of the end effector greatly departs from an original target position according to the external force.

In the present exemplary embodiment, the end effector 70 is moved to the operation range 503-1, but can be moved to the assembly starting position. Then, the force control can be made again, and a predetermined work is performed.

In step S308, a determination is made whether the assembly part 501 contacts with the assembly part to be assembled 502. In a case where a determination is made that the assembly part 501 does not contact with the assembly part to be assembled 502 (No in step SS308), the processing returns to step S306, and the control flow using the force control is repeated. As illustrated in FIG. 3D, in a case where the assembly part 501 contacts with the assembly part to be assembled 502, and an assumed contact force F1 between the assembly part 501 and the assembly part to be assembled 502 is detected by the torque sensor 97 of the robot arm boy 1, the processing proceeds to step S309.

In step S309, at a timing of contact force detection in step S308, the operation range 503-1 of the force control is switched to an operation range 503-2 (in FIG. 3E). The operation range 503-2 is set so that the seeking step in the respective assembly steps can be executed by the force control. Step S309 is an operation range switching step.

The operation range 503-2 can be set, as described in step S304, in accordance with design specifications of parts and the robot system 1000. Alternatively, the operation range 503-2 can be set by executing the actual seeking step more than once. In such a parts matching operation, the operation range 503-2 is narrower than the operation range 503-1 on the Z coordinate and also on the X-Y coordinate. As a result, departing from a range where assembly is desired to be performed is prevented, and alignment between the center of the assembly part 501 and the center of the assembly part to be assembled 502 is securely performed.

In order to determine whether the end effector 70 is within the operation range 503-2, the operation range 503-2 is offset toward the end effector 70 based on the reference point P, and the force control is made. Further, information about a range of the driving amount of the motor 92 in the robot arm body 1 is stored in the operation range storage unit 96. The information is used for driving so that the reference point P of the end effector 70 is in the operation range 503-2.

The control device 91 calls up, from the operation range storage unit 96, the driving amount range of the motor 92 in the robot arm body 1 for allowing the end effector 70 to be present within the operation range 503-2. The driving of the motor 92 in the robot arm body 1 is thus controlled.

In the present exemplary embodiment, the operation range is switched at a timing of the detection of the contact force, but the present invention is not limited to this. In a case of switching to the operation range 503-2 in step S309, the switching can be performed when the reference point P of the end effector 70 comes to a predetermined position. The predetermined position is a preset position like the assembly starting position set in step S303.

In step S310, as illustrated in FIG. 3F, the motor is controlled based on an arrow 601-2 indicating a direction of a command value of the force control. The assembly part 501 is then moved so that the seeking step starts.

In order to make the seeking step successful, a force control command value is input into a feedback control system so that the center axis C1 of the assembly part 501 matches with a center axis C2 of the assembly part to be assembled 502. Actually, the center of the assembly part 501 is offset with respect to the reference point P of the end effector 70 and the force control is made.

In step S311, similarly to step S306, the control device 91 determines, based on the detection value from the encoder 95 of the robot arm body 1, whether the assembly part 501 is in the operation range 503-2 switched in step S309.

In a case where the control device 91 determines that the assembly part 501 is not in the operation range 503-2 (No in step S311), the processing proceeds to step S312, and the force control is switched to the position control similarly to step S307. Control is then made so that the assembly part 501 returns to a predetermined position, set in advance, in the operation range 503-2. The seeking step then restarts.

In a case where the control device 91 determines that the assembly part 501 is in the operation range 503-2 (Yes in step S311), the processing proceeds to step S313. In step S313, a determination is made whether the seeking step completes. As illustrated in FIG. 3G, the axis C1 of the assembly part 501 and the axis C2 of the assembly part to be assembled 502 match with each other, and the assembly part 501 is pressed to a −Z direction. At this time, in a case where a reaction force F2 (<F1) that is preset as a threshold when the seeking step completes is detected by the torque sensor 97 provided to the robot arm body 1 (Yes in step S313), the processing proceeds to step S314. Otherwise (No in step S313), the centers of the assembly part 501 and the assembly part to be assembled 502 do not match with each other. For this reason, the processing returns to step S311 and the seeking step in the above control flow is repeated.

In step S314, a check is made, based on the detection of the reaction force in step S313, that a positional relationship is established such that the assembly part 501 and the assembly part to be assembled 502 can be inserted. The operation range of the force control is then switched from the operation range 503-2 to an operation range 503-3 (in FIG. 3H). The operation range 503-3 is set so that an insertion work in the assembly work can be executed by the force control. The operation range 503-3 can be set in accordance with the design specifications of parts as described in steps S304 and S309. Alternatively, the operation range 503-3 can be set based on a value measured in the actual insertion work. In such a part insertion operation, the operation range 503-3 is narrower than the operation range 503-2 on the XY coordinate and wider on the Z coordinate. As a result, unnecessary movements in the XY direction are reduced, and thus the assembly part 501 is guided to a direction where the assembly is desired to be performed.

Further, in order to determine whether the end effector 70 is within the operation range 503-3, the operation range 503-3 is offset based on the reference point P and control is made. Information about the driving amount range of the motor 92 of the robot arm body 1 corresponding to the operation range 503-3 is stored in the operation range storage unit 96.

The control device 91 calls up the information about the driving amount range of the motor 92 of the robot arm body 1 corresponding to the operation range 503-3 from the operation range storage unit 96. The control device 91 then makes the force control on the motors 92 of the robot arm body 1.

Further, similarly to step S309, the switching to the operation range 503-3 is performed at the timing of detection of the force by the torque sensors 97, but (the position) of the reference point P can be set as the switching timing.

Figure 3I:
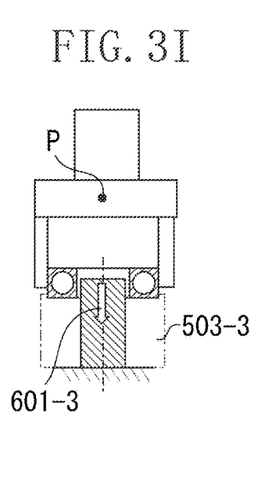
Figures 4, 4A:
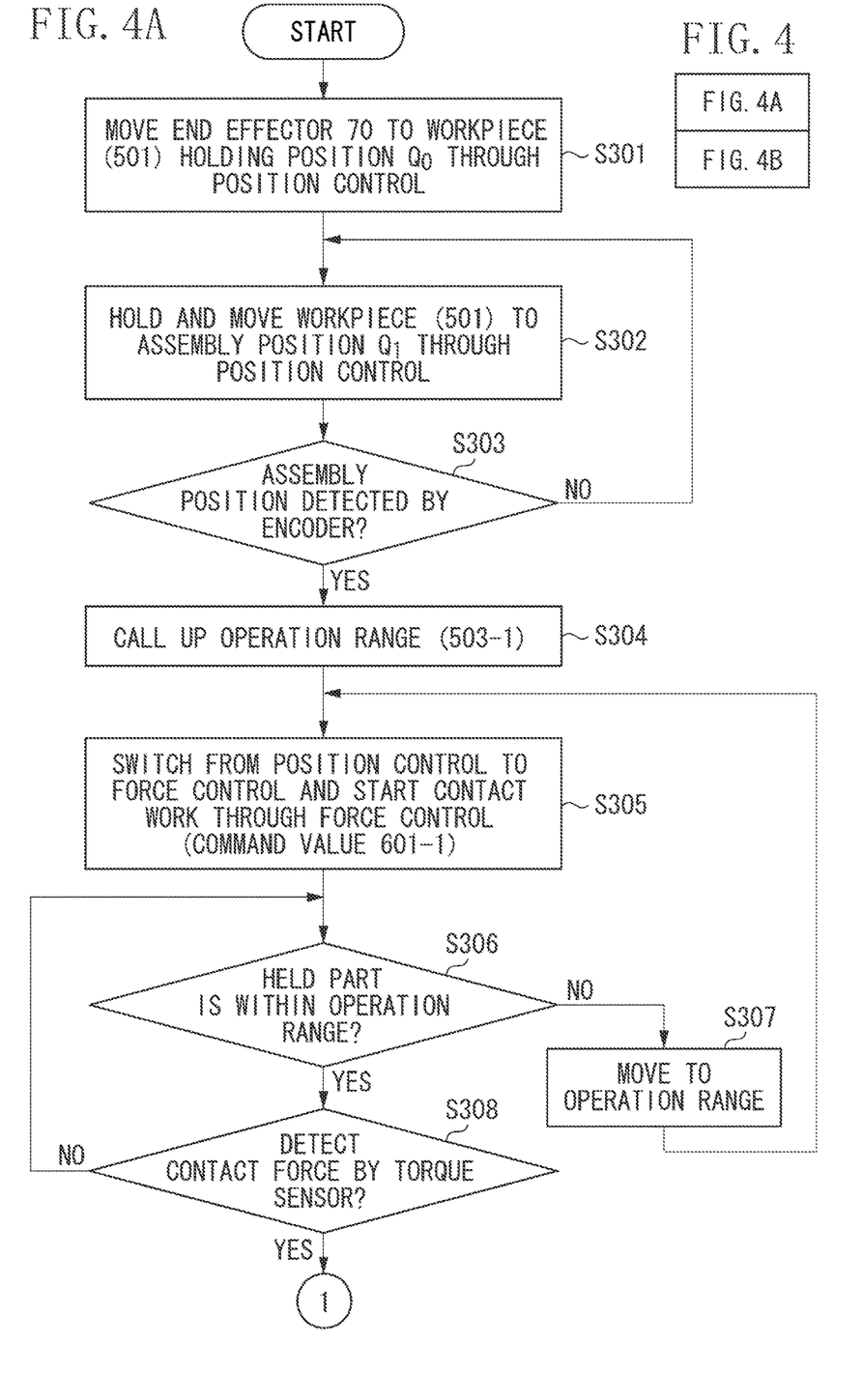
FIG. 4, composed of FIG. 4A and FIG. 4B, is a flowchart illustrating parts assembly steps according to the exemplary embodiment of the present invention.
Figure 4B:
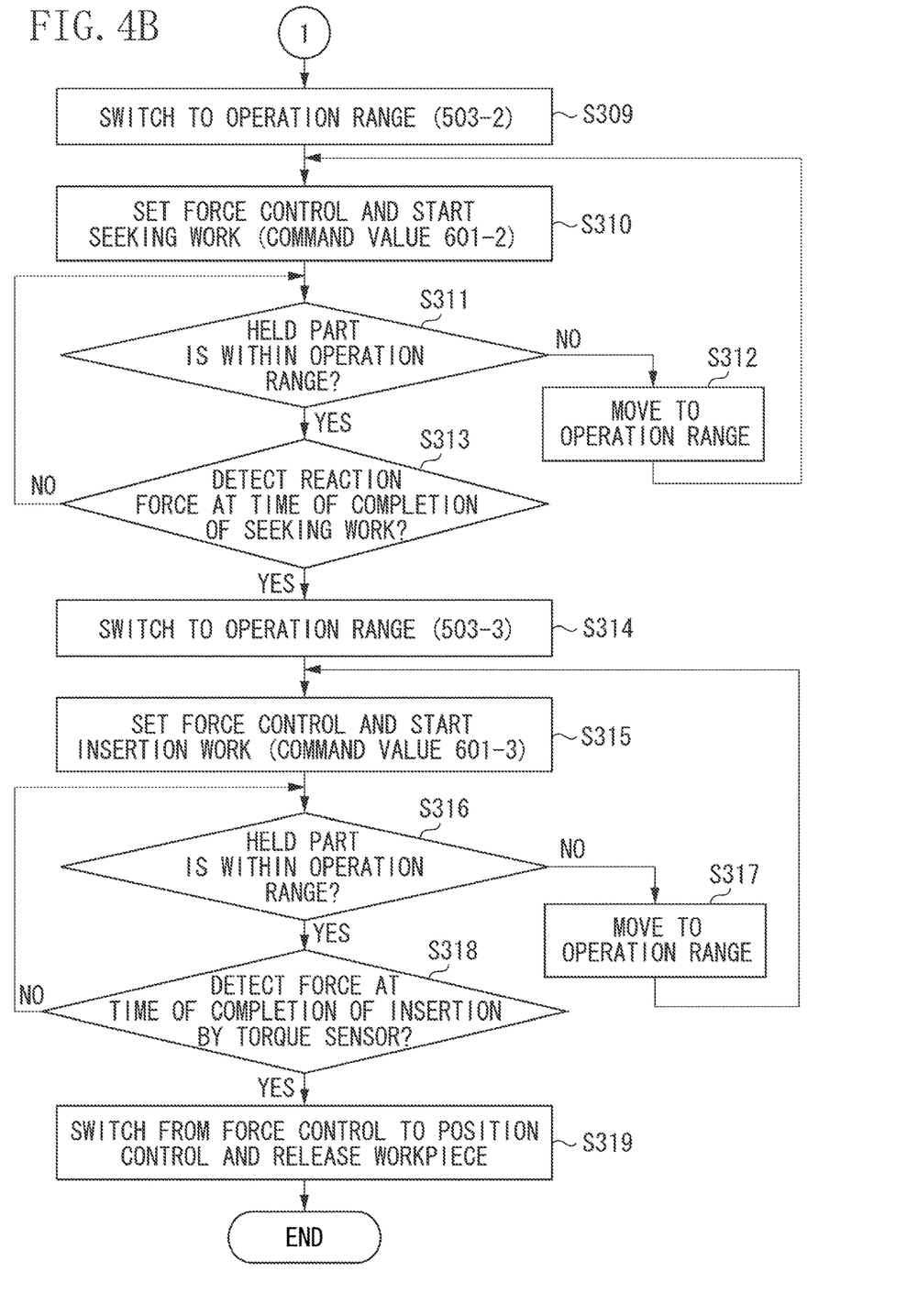

In step S315, as illustrated in FIG. 3I, based on a command value 601-3 indicating a force control target value, the motor 92 is force-controlled and the assembly part 501 is moved to the insertion direction. Actually, the center of the assembly part 501 is offset with respect to the reference point P of the end effector 70 and the force control is made.

In step S316, similarly to step S306, the control device 91 compares the detection value from the encoder 95 of the robot arm body 1 with a value from the operation range storage unit 96 to determine whether the assembly part 501 is within the operation range 503-3 switched in step S314.

In a case where the control device 91 determines that the assembly part 501 is not within the operation range 503-3 (No in step S316), the processing proceeds to step S317, and similarly to step S307, the force control is switched to the position control in step S317. The position control is then made so that the reference point P returns to a preset center of the operation range 503-3. The insertion work then restarts.

Figure 3J:
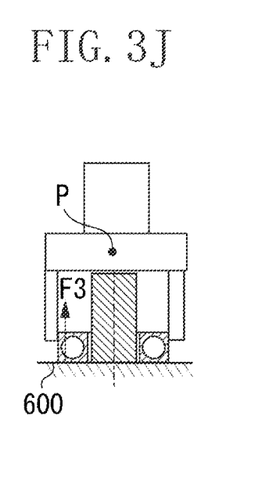

In a case where the control device 91 determines that the assembly part 501 is within the operation range 503-3 (Yes in step S316), the processing proceeds to step S318. In step S318, a determination is made whether the assembly part 501 completes insertion. In a case where the insertion work continues, as illustrated in FIG. 3J, the assembly part 501 touches the base 600, and a reaction force F3 is generated from the base 600. The reaction force F3 (>F1 and F2) is set as a threshold and the completion of the insertion is determined. In a case where the reaction force F3 is detected by the torque sensors 97 provided to the robot arm body 1 (Yes in step S318), the processing proceeds to step S319. Otherwise (No in step S318), the processing returns to step S316, and the insertion work control flow by the force control is repeated.

The reaction force from the base is used for the determination as to the completion of the insertion, but a descending amount of the reference point P of the robot arm body 1 can be used as a reference of the determination. After the operation performed in step S317, the processing returns to step S315, and the above flow is repeated.

In step S319, the force control is switched to the position control, the assembly part 501 is released, and the insertion work completes. The assembly thus ends.

The above control enables ranges in which the force control is made in the respective assembly steps to be set, limited, and switched. As a result, even if unexpected external perturbations exert on the robot arm body 1, correction can be made within a range in which the assembly succeeds without contact with parts other than the assembly part to be assembled. A success rate of the assembly can be thus improved.

Further, since a retry is performed at every assembly step, a retry from the first step does not have to be performed. Therefore, the assembly can be made to be efficient.

Figure 5:
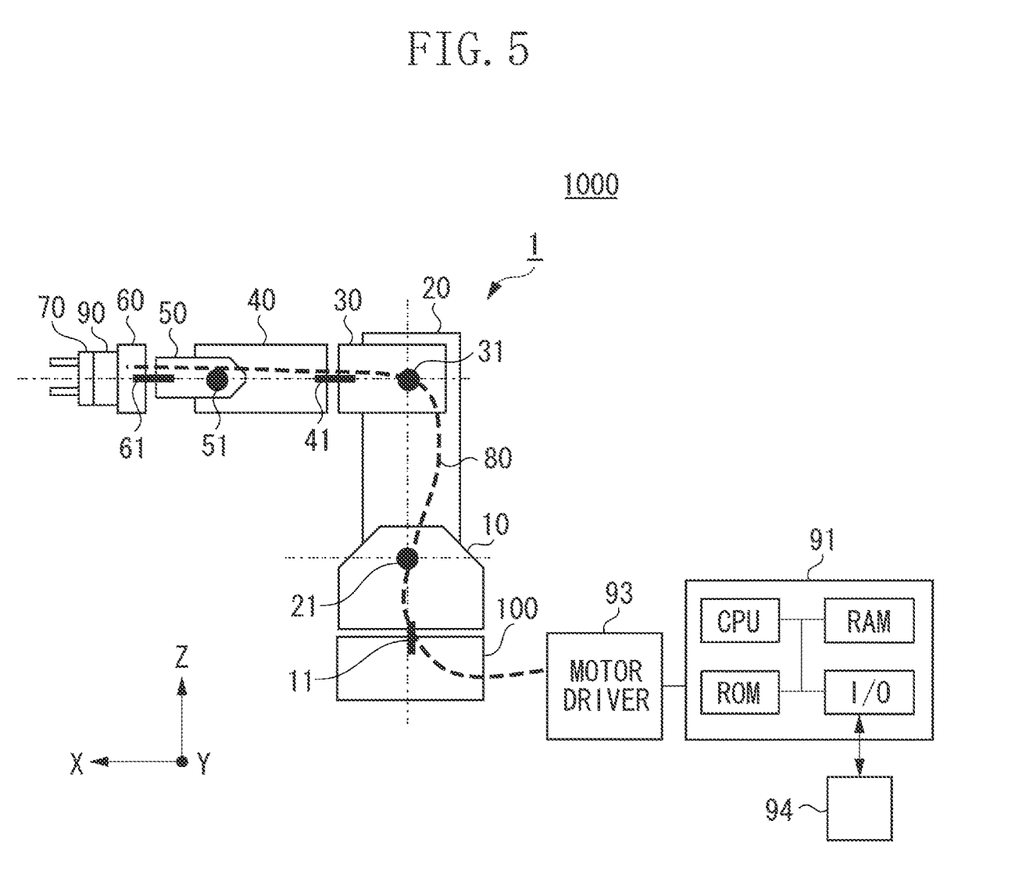
FIG. 5 is a diagram illustrating a case where a force sensor is provided in the robot system according to the exemplary embodiment of the present invention.

In the above-described exemplary embodiment, while the torque sensor is used as a force detection unit that detects force information, a force sensor can be used. FIG. 5 is a diagram illustrating a case where a force sensor 90 is disposed in the robot system 1000 according to the present exemplary embodiment. For example, the force sensor 90 is disposed between the link 60 and the end effector 70.

The force sensor 90 can detect totally six-axis force in a three-axis translational direction (XYZ direction) and a three-axis rotational direction (θxθyθz direction). The six-axis force are decomposed and calculated whereby it is possible to obtain torques generated in the six rotary joints 11 to 61 of the robot arm body 1 according to the present exemplary embodiment. Further, the torques of the joints can be controlled. Details of the force sensor 90 are not illustrated, but a publicly-known configuration can be used.

In the present exemplary embodiment, the determination is made whether the end effector 70 is within the operation range in a manner that the encoder 95 detects the driving amount of the motor 92. However, the present invention is not limited to this. For example, an image capturing device images a position of the end effector 70, and a determination can be made whether the position of the end effector 70 is within the operation range using image processing. At this time, an operation range is set on the image obtained by the image capturing device, and a check is directly made whether the position of the end effector 70 is within the operation range.

Specifically, the processing procedure of the assembly operation according to the present exemplary embodiment is executed by the control device 91. Therefore, a configuration can be such that a non-transitory recording medium that stores programs of software realizing the above-described functions is supplied to the control device 91, and the CPU loads the programs stored in the recording medium (the operation range storage unit 96) to execute the programs. In this case, the programs themselves read from the recording medium realize the above-described functions according to the exemplary embodiment. Therefore, the programs and the recording medium storing the programs configure the present invention.

Further, each of the exemplary embodiments has described the case where the recording medium readable by a computer is a ROM or a RAM and the programs are stored in the ROM or the RAM. However, the present invention is not limited to this. The programs for carrying out the present invention can be stored in any recording medium as long as the recording medium is readable by a computer. For example, a hard disk drive (HDD), an external storage device, or a recording disk can be used as the recording medium that provides the programs.

INDUSTRIAL APPLICABILITY

The present invention is applicable to industrial robots.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-140153, filed Jul. 19, 2017, which is hereby incorporated by reference herein in its entirety.

What is claimed is:

1. A robot apparatus configured to perform at least two contact works to bring a first object and a second object into contact with each other, the robot apparatus comprising:
 a control unit configured to control the robot apparatus,
 wherein the control unit includes information about an operation range set for each of the contact works and in which each of the contact works is performed within the operation range corresponding to each of the contact works by force control in a space where the contact works are performed, and
 wherein the control unit moves a predetermined portion of the robot apparatus into the operation range by position control in a case where the control unit detects that the predetermined portion is out of the operation range.

2. The robot apparatus according to claim 1, further comprising:
 a robot arm;
 an end effector; and
 a position detection unit configured to detect a position of the predetermined portion, the predetermined portion being a part of the end effector,
 wherein the control unit controls the robot arm so that each of the contact works is performed within the operation range corresponding to each of the contact works by force control based on the position detection unit.

3. The robot apparatus according to claim 1, further comprising:
 a position detection unit configured to detect a position of the predetermined portion of the robot apparatus,
 wherein the control unit moves the predetermined portion into the operation range in a case where the control unit detects that the predetermined portion is out of the operation range based on the position detection unit.

4. The robot apparatus according to claim 3, wherein the control unit moves the predetermined portion to a predetermined position in the operation range or a start position of each of the contact works in a case where the control unit detects that the predetermined portion is out of the operation range based on the position detection unit when the control unit performs each of the contact works.

5. The robot apparatus according to claim 4, wherein the predetermined position is a center position in the operation range.

6. The robot apparatus according to claim 5, wherein a range for moving the predetermined region back to the operation range by the position control and a range for moving the predetermined region back to the operation range by the force control are set in the operation range in a case where the predetermined region is detected outside the operation range based on the position detection unit.

7. The robot apparatus according to claim 3, wherein the control unit detects the position of the predetermined portion by the position detection unit during a time after each of the contact works is started and until each of the contact works is ended when the control unit performs each of the contact works.

8. The robot apparatus according to claim 2, further comprising a force detection unit configured to detect a force applied to the end effector,
 wherein the control unit performs the force control based on the force detection unit.

9. The robot apparatus according to claim 2, wherein the predetermined portion is a reference position to control the end effector.

10. The robot apparatus according to claim 1, wherein the control unit selectively moves the predetermined portion into the operation range by position control or moves the predetermined portion into the operation range by force control when the predetermined portion is out of the operation range.

11. The robot apparatus according to claim 1, wherein the operation range is set in advance based on an experiment of the contact works.

12. The robot apparatus according to claim 1, wherein the control unit switches the operation range based on the contact works when the control unit switches the contact works.

13. The robot apparatus according to claim 1, wherein the contact works are two of a close work to bring the first object closer to the second object to bring the first object into contact with the second object, a seeking work to move the first object while keeping the first object in contact with the second object, and an insertion work to insert one of the first object and the second object into the other.

14. The robot apparatus according to claim 13, wherein the operation range for the seeking work is smallest among the operation ranges.

15. The robot apparatus according to claim 1, wherein the control unit includes a storage unit in which the information is stored.

16. The robot apparatus according to claim 1, further comprising:
 a robot arm;
 an end effector,
 wherein the control unit positions a predetermined region of the end effector at a start position of a close work to bring the first object closer to the second object by the end effector by position control.

17. The robot apparatus according to claim 16, wherein the control unit switches the position control to the force control in a case where the close work is started.

18. The robot apparatus according to claim 16, wherein the control unit holds the first object by the end effector by the position control.

19. The robot apparatus according to claim 16, wherein the control unit sets the operation range corresponding to the close work in a case where the predetermined region of the end effector is positioned at the start position of the close work.

20. The robot apparatus according to claim 19, wherein the control unit sets the operation range corresponding to a seeking work to move the first object while keeping the first object in contact with the second object, in a case where a contact of the first object with the second object is detected while the close work is being performed.

21. The robot apparatus according to claim 20, wherein the control unit sets the operation range corresponding to an insertion work to insert the first object into the second object in case where a predetermined force is detected while the seeking work is being performed.

22. A control method for a robot apparatus configured to perform at least two contact works to bring a first object and a second object into contact with each other, wherein the robot apparatus includes a control unit configured to control the robot apparatus, wherein the control unit includes information about an operation range set for each of the contact works and in which each of the contact works is performed within the operation range corresponding to each of the contact works by force control in a space where the contact works are performed, and wherein the control unit moves a predetermined portion of the robot apparatus into the operation range by position control in a case where the control unit detects that the predetermined portion is out of the operation range.

23. A non-transitory computer-readable recording medium storing a program for causing a computer to execute the control method for the robot apparatus according to claim 22.

24. A producing method for an article using a robot apparatus configured to perform at least two contact works to bring a first object and a second object into contact with each other, wherein the robot apparatus includes a control unit configured to control the robot apparatus, wherein the control unit includes information about an operation range set for each of the contact works and in which each of the contact works is performed within the operation range corresponding to each of the contact works by force control in a space where the contact works are performed, and wherein the control unit moves a predetermined portion of the robot apparatus into the operation range by position control in a case where the control unit detects that the predetermined portion is out of the operation range, assembles the first object with the second object, and produces an article.

* * * * *